(No Model.)

J. W. HARVEY.
CAR BRAKE.

No. 410,891. Patented Sept. 10, 1889.

Witnesses
F. G. Fischer
A. A. Higdon

Inventor
John W. Harvey
By his Attorney
J. A. Higdon

UNITED STATES PATENT OFFICE.

JOHN W. HARVEY, OF KANSAS CITY, MISSOURI.

CAR-BRAKE.

SPECIFICATION forming part of Letters Patent No. 410,891, dated September 10, 1889.

Application filed January 17, 1889. Serial No. 296,588. (No model.)

*To all whom it may concern:*

Be it known that I, JOHN W. HARVEY, of Kansas City, Jackson county, Missouri, have invented certain new and useful Improvements in Car-Brakes, of which the following is a full, clear, and exact description, reference being had to the accompanying drawings, forming a part hereof.

My invention relates to improvements in railway-car brakes; and it consists in the novel construction and combination of the different parts, as will more fully appear hereinafter, and then be pointed out in the claims.

Heretofore the usual manner of braking car-wheels has been to apply the brake-shoes directly to the periphery of the wheels, which plan is objectionable, for the reason that the axle is liable to become broken by the severe torsional strain, and the wheels are also flattened more or less by this method of braking, thus rendering traveling very annoying and dangerous.

My invention has for its object to remedy all these defects, and I accomplish it by means of a brake in which the shoes are brought directly in contact with the tread and side of the rails, thereby quickly checking the motion of the train.

Figure 1:
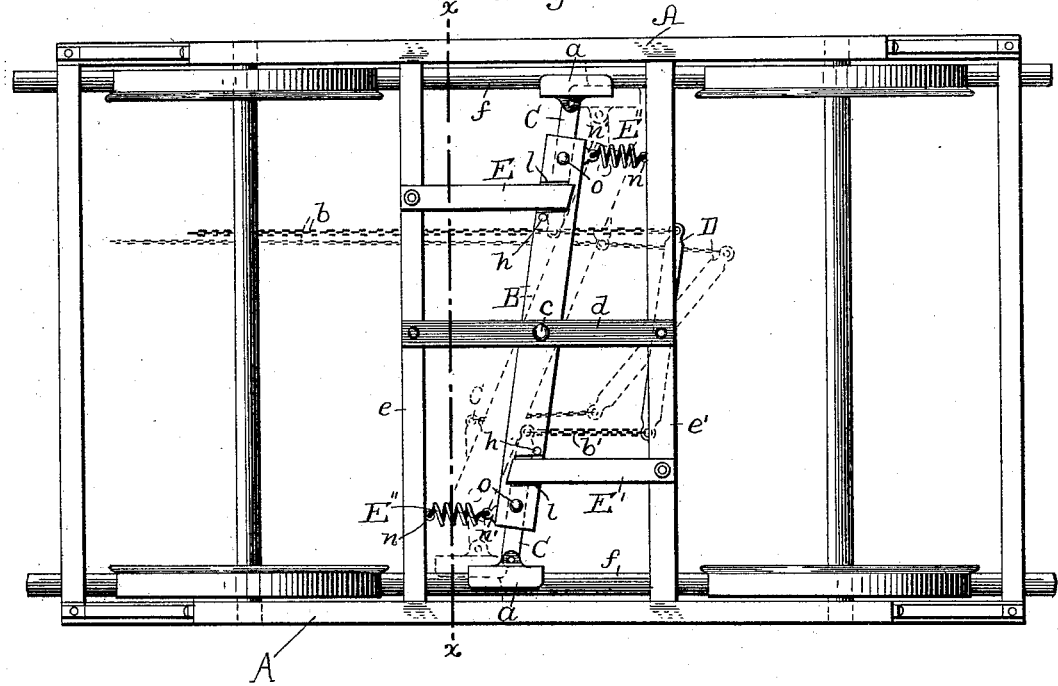
Figure 2:
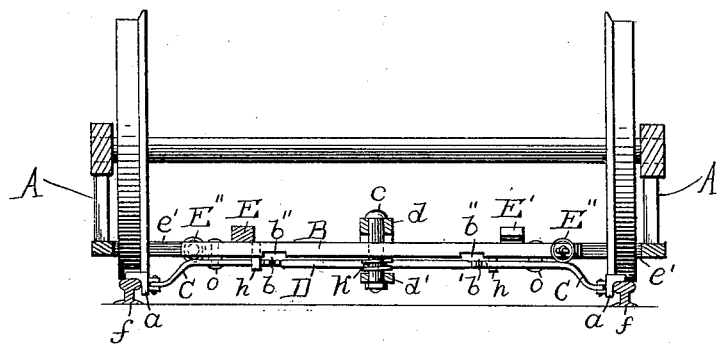
Figure 3:
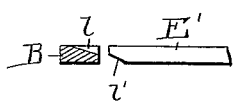

In the accompanying drawings, forming part of this specification, Figure 1 is a plan view of my improved brake as applied, the bottom of car being removed. Fig. 2 is a transverse sectional view taken on the line $xx$ of Fig. 1, and Fig. 3 shows details of construction.

Referring to the drawings, on which similar letters of reference indicate corresponding parts in all the views, A indicates the car-truck frame and $e\ e'$ the connecting cross-pieces or bolsters. At the middle of the bolsters $e\ e'$ is secured cross-bar $d$, to which is pivotally connected the lever B by means of the bolt $c$, and at either end of the lever B are pivoted the supplemental levers C C by means of the bolts $o\ o$, and to the outer ends of such levers are connected the angular brake-shoes $a\ a$.

Between the cross-piece $d$ and the bolster $e'$ is pivoted a second lever D, provided with eyes at either end. The supplemental levers C are also provided with eyes on their inner ends, to which are attached the chains $b\ b'$, said chains serving to connect the lever C with the lever D. The chain $b$ is continued beyond the supplemental lever and passes around the chain drum or shaft attached to the brake-handle. (Not shown.) At either end of the lever B and upon opposite sides are the eyes $n'\ n'$, and at opposite points on the bolsters $e\ e'$ are secured similar eyes $n\ n$, and fastened in these eyes are the coiled springs $E''\ E''$, which serve to throw the brake-shoes to their normal position the moment the force is released.

To prevent the shoes sliding along the rails $f$ when applied, I secure the inwardly-extending arms E E' to the bolsters $e\ e'$ respectively, said arms extending just far enough inward to overlap the lever B when the brake is applied. The ends of the arms are beveled, as at $l'$, and where they bear upon the lever B, I cut the inclined grooves $l$, as clearly shown in Fig. 3. By this mechanism when the brakes are applied the lever B, swinging against the arms E E', will be forced down, thereby holding the shoes firmly against the rails. To throw the lever B up into its proper position and raise the shoes when the brake is released, I use a coil-spring $k$, passed around the pivot-bolt $c$ and working between the lever B and a cross-piece $d'$, secured to the under sides of the bolsters $e\ e'$. Pins $h\ h$ are fixed in the under side of the lever B, upon which the inner ends of the supplemental levers C C strike, and by this arrangement it will be seen that the levers C cannot swing past the lever B, but will be always kept in alignment therewith.

The operation of my improved brake is as follows: The chain having been wound around the chain drum or shaft, the lever D is brought forward, as is also the lever B, which movement simultaneously operates both supplemental levers, and thus both shoes are thrown against the rails, and as the lever B swings against the arms E E' the entire combination of levers B and C is pressed down by the beveled ends and inclined slots and the shoes are held firmly against the sides and tread of the rails. It will be observed that the chain $b$ is not directly connected to lever B, but is connected with it only through the supplemental levers C, as shown. The lever is now in a position nearly at right angles with the rails, and any forward movement of the car tends only to bind the shoes the tighter. The springs E″ are at this moment extended and the spring K contracted; but the moment the force is released the spring k expands and throws the lever up to its normal level and the springs E″ force it back to its usual position and the entire apparatus is ready to be applied again.

Having thus described my invention, what I claim, and desire to secure by Letters Patent, is—

1. In a car-brake, the combination, with a car-truck frame and bolsters, of the lever B, carrying a supplemental lever provided with a brake-shoe adapted to bind against the rail, and a chain or rod for operating said levers, substantially as shown and described.

2. In a car-brake, the combination, with a car-truck frame and bolsters, of a lever carrying supplemental levers upon either end, said levers being provided with brake-shoes adapted to bear against the rail, the lever D, and chain b b′, for operating the levers, substantially as shown and described.

3. The combination, with the bolsters, of the lever B, provided with inclined faces near either end, and the arms E E′, secured to the bolsters and beveled at their inner ends and adapted to bear upon the inclined faces of the lever B, substantially as shown and described.

4. The combination, with the bolsters, of the lever B, provided with inclined faces near either end, the inwardly-extending arms E E′, beveled at their inner ends, the spring k, and the cross-piece d′, all arranged and adapted to operate substantially as shown and described.

5. The combination, with the bolsters, of the lever B, second lever D, and supplemental levers C, carrying the brake-shoes on their outer ends, the chains for operating the levers, and the springs for throwing them back when released, substantially as shown and described.

6. The combination, with the bolsters, of the lever B, second lever D, and supplemental levers C, carrying the brake-shoes at their outer ends, the chains b b′ and arms E E′, and the springs for throwing the levers and shoes to their normal positions, substantially as shown and described.

7. In a car-brake, the combination, with the bolsters, of the levers B and D, chains operating said levers, the supplemental levers carrying the brake-shoes and attached to the ends of the main lever B, the arms E E′, the springs E″, the spring k, and the cross-piece d′, all arranged and adapted to operate substantially as shown and described.

In testimony whereof I affix my signature in presence of two witnesses.

JOHN W. HARVEY.

Witnesses:
  F. G. FISCHER,
  A. A. HIGDON.